US009768475B2

(12) United States Patent
McGee

(10) Patent No.: US 9,768,475 B2
(45) Date of Patent: Sep. 19, 2017

(54) BATTERY PACK CONTAINING COMMUNICATION ELECTRONICS

(71) Applicant: Apollo America Inc., Auburn Hills, MI (US)

(72) Inventor: Rochelle McGee, Waterford, MI (US)

(73) Assignee: Apollo America Inc., Auburn Hills, MI (US)

(*) Notice: Subject to any disclaimer, the term of this patent is extended or adjusted under 35 U.S.C. 154(b) by 0 days.

(21) Appl. No.: 14/818,401

(22) Filed: Aug. 5, 2015

(65) Prior Publication Data

US 2016/0049697 A1 Feb. 18, 2016

Related U.S. Application Data

(60) Provisional application No. 62/036,355, filed on Aug. 12, 2014.

(51) Int. Cl.
| | |
|---|---|
| *G08B 23/00* | (2006.01) |
| *H01M 10/42* | (2006.01) |
| *H01M 2/10* | (2006.01) |
| *G08B 17/10* | (2006.01) |
| *G08B 17/117* | (2006.01) |
| *G08B 25/00* | (2006.01) |
| *G08B 25/08* | (2006.01) |

(52) U.S. Cl.
CPC ........ *H01M 10/4257* (2013.01); *G08B 17/10* (2013.01); *G08B 17/117* (2013.01); *G08B 25/009* (2013.01); *G08B 25/08* (2013.01); *H01M 2/1022* (2013.01)

(58) Field of Classification Search
CPC .. H01M 10/4257; H01M 2/1022; G08B 27/00
USPC ......... 340/502, 693.1, 501, 504, 514, 539.1, 340/636.15; 429/90, 302, 61; 324/207.2, 324/426, 434
See application file for complete search history.

(56) References Cited

U.S. PATENT DOCUMENTS

| | | | | |
|---|---|---|---|---|
| 2002/0193955 A1* | 12/2002 | Bertness | ............ | G01R 31/3627 702/63 |
| 2004/0151282 A1* | 8/2004 | Jones, III | ............ | H04L 12/2827 379/37 |
| 2009/0015245 A1* | 1/2009 | Burrows | ............... | A61J 7/0481 324/207.2 |
| 2011/0001484 A1* | 1/2011 | Stits | ..................... | H01M 10/00 324/426 |
| 2014/0009090 A1* | 1/2014 | Ashida | ................... | H02P 31/00 318/139 |
| 2015/0064525 A1* | 3/2015 | Henrici | ............... | H01M 2/1673 429/90 |
| 2015/0318582 A1* | 11/2015 | Brockman | ......... | G01R 31/3606 320/137 |

* cited by examiner

*Primary Examiner* — Dhaval Patel
(74) *Attorney, Agent, or Firm* — Dinsmore & Shohl LLP

(57) ABSTRACT

A communication electronics module is provided having a casing like a conventional battery and includes terminals which enable the module to fit into a battery socket. The module may also be incorporated into a single-cell battery or a multiple-cell battery pack. The module communicates with both the battery, the electronic device powered by the battery and other remote electronics devices.

29 Claims, 3 Drawing Sheets

BATTERY PACK CONTAINING COMMUNICATION ELECTRONICS

REFERENCE TO RELATED APPLICATIONS

This application claims priority from U.S. Provisional Patent Application Ser. No. 62/036,355, filed Aug. 12, 2014, the entire content of which is incorporated herein by reference.

FIELD OF THE INVENTION

This invention relates generally to communication electronics that may be incorporated in batteries used for smoke detectors, CO detectors, or the like. The invention relies on the communication electronics to detect audio signals generated by smoke detectors and relay audio signals to a remote receiver such as a control panel, or to transmit the signals to other smoke detectors in order to trigger alarm signals of their own.

BACKGROUND OF THE INVENTION

Electronic devices of the type that generate an audible signal when an alarm condition is sensed, such as a smoke detector or a CO detector, are often installed in residential and commercial buildings. There are often a number of these devices distributed throughout the building. Presently, such sensor devices suffer from the fact that the audio signals may occur at a time when there are no personnel in the building or those persons in the building are not sufficiently close to the devices to hear the audible signals.

A good solution for this might be to use more intelligent sensor devices which are equipped to effectively relay the alarm signals to a control panel or trigger the alarms of other sensor devices to generate alarms throughout the building.

More intelligent sensor devices capable of communications have been developed over the years. For example, Google's smart smoke alarm Nest Protect® sends users a message on the phone when the battery is running low. Nest Protect offers a human voice that gives an early warning when it detects smoke. In situations wherein the smoke results from a nondangerous source, such as from burning toast, persons nearby have opportunity to correct the problem before the alarm starts screeching. When something is wrong, Nest Protect alerts your smartphone in case you are not home. If desirable, the alarm may be deactivated by only a tap on the smartphone.

However, Nest Protect devices do not communicate with other Nest Protect devices.

It may be expensive to replace existing smoke detectors with new smarter devices. Consumers may grow accustomed to their old devices despite some of their annoying traits.

However, if the old devices could be upgraded by simply replacing the old batteries with a more intelligent battery at an affordable price, consumers may be more willing to make the change.

Significant efforts have been made to develop intelligent batteries having electronic circuitry embedded inside the battery. However, there are also problems associated with having electronic circuitry embedded in a battery. For example, the corrosive environment of the battery cell may cause damage to the electronic circuitry. Or the battery may fail when the electronic circuitry is damaged. U.S. Pat. No. 6,979,502B1 to Gartstein, granted Dec. 27, 2005, is directed to a battery having an independent housing containing electronic circuitry. The housing may be snapped onto the battery cell to form an assembly which may fit in a battery socket. The electronic circuitry of Gartstein is limited to communicating to the battery cell, as opposed to communicating to the electronic device powered by the battery or other remote electronic devices.

SUMMARY OF THE INVENTION

The present invention provides a communication electronics module which has its own casing of the same dimensions as a battery, such as 1.5 or 9 volt battery, and may be incorporated in a single-cell battery or a multiple-cell battery pack. The communication electronics module of the present invention may also be a stand-alone device which may fit in a single slot of a multiple-slot battery socket and be powered by the batteries in the neighboring slots of the same battery socket. The communication electronics module may communicate with the battery cells in the battery or battery packs of the present invention, or with the batteries in neighboring slots of the same battery socket. In addition, the communication electronics module may communicate with the electronic device powered by the battery or battery pack of the present invention. Finally, the communication electronics module may also communicate with remote electronic devices.

It is an object of this invention to provide a communication electronics module incorporated in a housing the same size as the conventional battery pack, with one or more cells of the battery removed to make room for the communication electronics module or modules.

According to an embodiment of the present invention, the communication electronics module includes its own casing with a positive circuit terminal and a negative circuit terminal. The communication electronics module may be powered by the battery cells in the battery pack.

The module further includes one or more sensors and a transmitter enclosed in the casing and electrically connected to the terminals of the casing. Therefore, power may be supplied to the circuit inside the casing through the circuit terminals.

The sensor is for sensing a signal generated by an independent device. For example, the independent device may be a smoke detector, a CO detector, or the like. The type of signal generated by the electronic device may be an audio signal when an alarm condition is sensed.

The sensor may be a microphone, a vibration sensor or any other type of audio sensor. The sensor may also be a current draw sensor or any type of sensing elements for current measurements, such as shunt resistor, a direct current resistance circuit, or a Hall Effect sensor.

The transmitter incorporated in the battery casing operates to transmit a signal to a remote receiver upon sensing the signal from the electronic device. The signal transmitted by the transmitter may be an audio signal.

In another embodiment, the module may include a transceiver. The transceiver is operable to transmit a signal to a remote receiver upon sensing the signal from the electronic device, and may incorporate circuits to receive an acknowledgement signal from the remote receiver after the remote receiver receives the signal transmitted by the transceiver.

The communication electronics module may also be operable to turn off the alarm signal or perform other actions such as changing the sound of the audible sensor or switching to auxiliary external power supplies for the alarm upon receiving the acknowledgement signal from the remote receiver.

The electronic device may be an electronic device powered by the battery pack including the communication electronics module. For example, when an alarm is sensed, a smoke detector generates an alarm signal. The communication electronics module senses the alarm signal and then relays that signal to a remote control panel.

It is another object of this invention to provide a communication electronics module incorporated in a housing the same size as a conventional single-cell battery. The housing includes a positive terminal and a negative terminal configured to fit in a conventional single battery socket of an electronic device. When the communication electronics module is plugged in a single slot of a multi-slot battery socket and conventional batteries are plugged in other slots of the multi-slot battery socket, the communication electronics module is powered by the batteries plugged in other slots of the multi-slot battery socket.

In another embodiment, a physically smaller but higher energy density battery cell is included in the housing to supply power to the communication electronics module. When the communication electronics module is plugged in a slot of the battery socket of an electronic device, the electronic device is powered by the battery cell in the communication electronics module and the communication electronics module communicates with the electronic device. In addition, the communication electronics module is operable to communicate with a remote electronic device that is not powered by the battery cell in the communication electronics module.

The communication electronics module may further include a micro-switch for sensing the connection between the contacts of the module and the mating contacts of the powered electronic device when the communication electronics module is plugged in a slot of the battery socket of the electronic device.

The communication electronics module may further include a switch for connecting or disconnecting the battery cell from the powered electronic device, under certain conditions such as receiving an appropriate signal via the transceiver.

The communication electronics module is also operable to communicate with a remote receiver such as a remote safety and fire control panel. This communication may be done by a wired connection extending from the battery housing electronics or, preferably, by some wireless transmission such as RF, infrared, or the like to the remote receiver. This communication may also take the form of a cell phone transmission to a designated URL on the Internet.

Therefore, the communication electronics module may further include a random access memory for storing the URLs and other related data.

The communication electronics module may further include a monitoring circuit for monitoring battery life of the battery cell.

The communication electronics module may further include a compensating circuit for a lithium battery.

DETAILED DESCRIPTION OF THE INVENTION

The present invention provides a communication electronics module that is disposed in a casing like that of a consumer battery. The present invention further provides a communication electronics module that is affixed to a consumer battery or battery pack. The term "battery," as used in this application, refers to a casing having a battery cell and terminals. The term "battery," as used in this application, may be a cylindrical battery such as AAAA, AAA, AA, C or D. The term "battery," as used in this application, may also be a prismatic battery such as a 9 V battery. The term "battery pack," as used in this application, refers to a housing having terminals and more than one battery cell.

Figure 1:
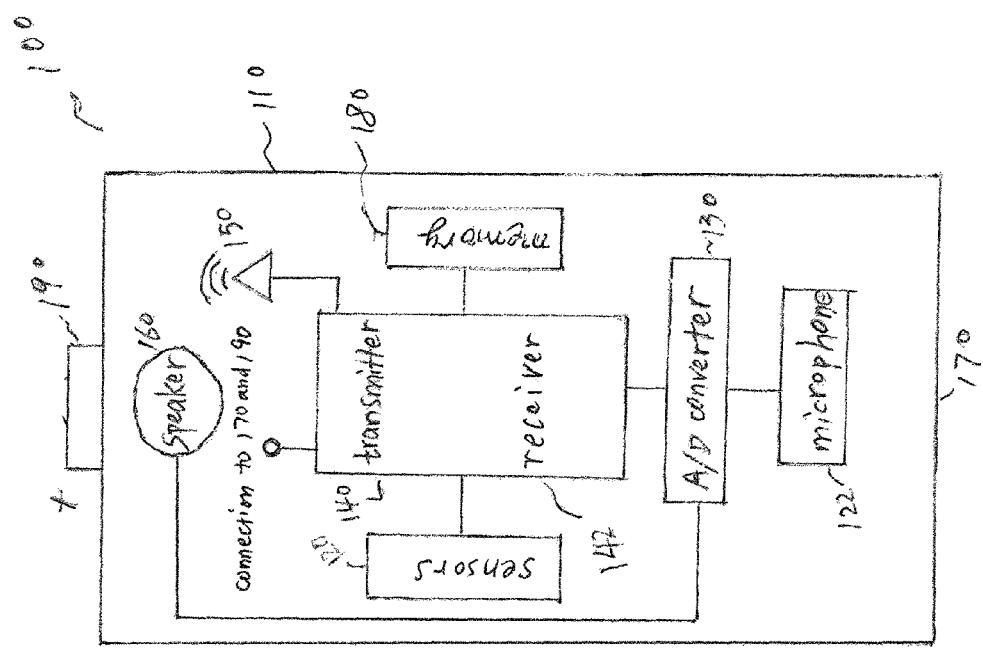
FIG. 1 is a schematic of an embodiment of the communication electronics module.

FIG. 1 is a schematic of a communication electronics module 100 according to an embodiment of the present invention. The communication electronics module 100 is provided with a casing 110 and two circuit terminals, namely a positive terminal circuit terminal 190 and a negative circuit terminal 170. In another embodiment, both of two circuit terminals may be located on the top of the casing, as in a 9 V battery. The casing may be metallic or plastic. Various sensors are disposed in the casing 110. The sensor may be a microphone 122 for sensing audio signals. The sensors 120 may also be a vibration sensor, a current draw sensor, or any type of sensing elements for current measurements. By sensing an audio alarm signal directly, or by measuring the current draw from the battery which increases when an alarm is sounded, the communication electronics module is able to sense the powered electronic device going into an alarm condition. An analog to digital converter may be included to convert analog signals from a microphone or a vibration sensor.

Referring still to FIG. 1, the communication electronics module is provided with a transmitter 140. When the smoke detector or the like sounds its alarm, the microphone 122 picks up the sound and triggers the transmitter 140 to relay the alarm signal to a remote receiver (not shown), such as a safety and fire control panel disposed in the same building, or trigger the transmitter 140 to transmit Internet signals to websites whose URLs are stored in the memory 180 of the module 100, or transmit a message to smartphones whose numbers are stored in the memory 180.

For example, the sound the microphone picks up may be generated by an electronic device powered by the battery including the module 100. Or the sound may be generated by an electronic device in a different location in the building. Correspondingly, when the sound picked up by the microphone comes from another electronic device, the transmitter 140 may generate it own alarm signal at the electronic device 100. If the sound picked up by the microphone comes from the electronic device 100 which the microphone is situated in, the transmitter 140 may trigger an alarm signal at a different electronic device if the electronic device also includes a communication electronics module 100.

The transmitter 140 may be replaced by a transceiver by incorporating a receiver 142 in the communication electronics module 100. The receiver 142, after the module sending an alarm signal, may receive a responsive acknowledgement signal from the remote receiver and make a decision to either turn off or change the sound of the alarm or perform other actions such as switching to an auxiliary external power supplies (not shown) for the alarm.

In another embodiment, a microcontroller (not shown) may be included to determine when or whether to transmit signals to the remote receivers and turn off the transmitted signals.

The transmission of signals from the transmitter 140 or the transceiver (140 and 142) may be done by a wired connection extending from the module 100 or, preferably, by some wireless transmission such as RF, infrared, or the like. Therefore, an antenna 150 is provided in the module 100.

In another embodiment, the transmitter may send a message to a smartphone via a WIFI connection to alert a person who may not be in the same location as the alarm. The circuitry inside the casing 110 may be powered by external power supplies through the terminals 170 and 190.

Figure 2:
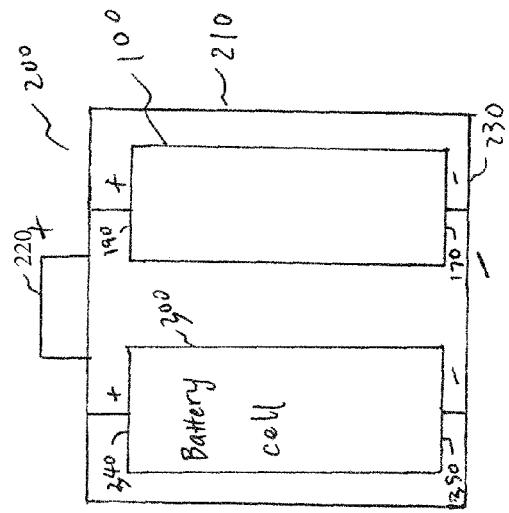
FIG. 2 illustrates an embodiment of a multi-cell battery pack of the present invention.

FIG. 2 is a schematic of a battery pack 200 which includes two slots for battery cells 300. One of the normal battery cells is removed to make room for the communication electronics module 100 like that shown in FIG. 1. As a result, in this battery pack shown in FIG. 2, there is only one conventional battery cell 300 remaining. A housing 210 is provided for the battery pack 200 to receive both the battery cell 300 and the module 100. A positive battery pack terminal 220 is electrically connected to both the positive electrode 340 of the battery cell 300 and the positive circuit terminal 190 of the module 100. The negative battery pack terminal 230 is electrically connected to both the negative electrode 350 of the battery cell 300 and the negative circuit terminal 170 of the module 100. The module 100 in FIG. 2 is powered by the battery cell 300. In one embodiment, the module 100 may include a circuit for monitoring the battery life of the battery cell 300. The transmitter 140 within the module 100 may alert a smartphone when the battery cell is running low.

Figure 3:
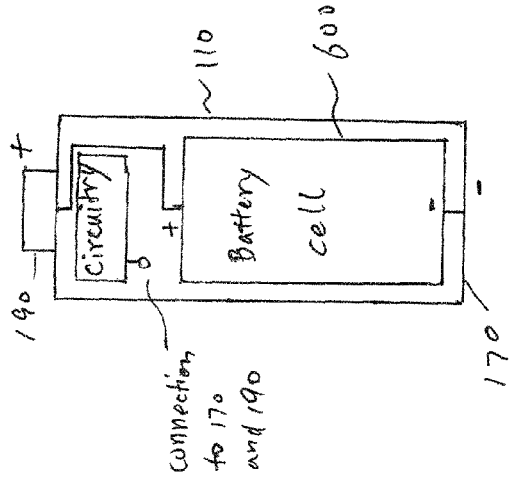
FIG. 3 illustrates an embodiment of a single-cell battery of the present invention.

FIG. 3 illustrates an embodiment of the communication electronics module that is also a battery. Provided within the casing 110 are the circuitry and a battery cell 600. The circuitry includes all components included in the casing 100 as shown in FIG. 1 as discussed earlier. The battery cell 600 is physically smaller but has higher energy density than a conventional battery cell 300 as shown in FIG. 2. The circuitry is powered by the battery cell 600. The module 100 shapes and works like a battery. The module 100 may be inserted into a conventional single-cell battery socket. The terminals 190 and 170 provide electrical contacts between the module 100 and the battery socket. In one embodiment, the module 100 may include a circuit for monitoring the battery life of the battery cell 600.

Figure 4:
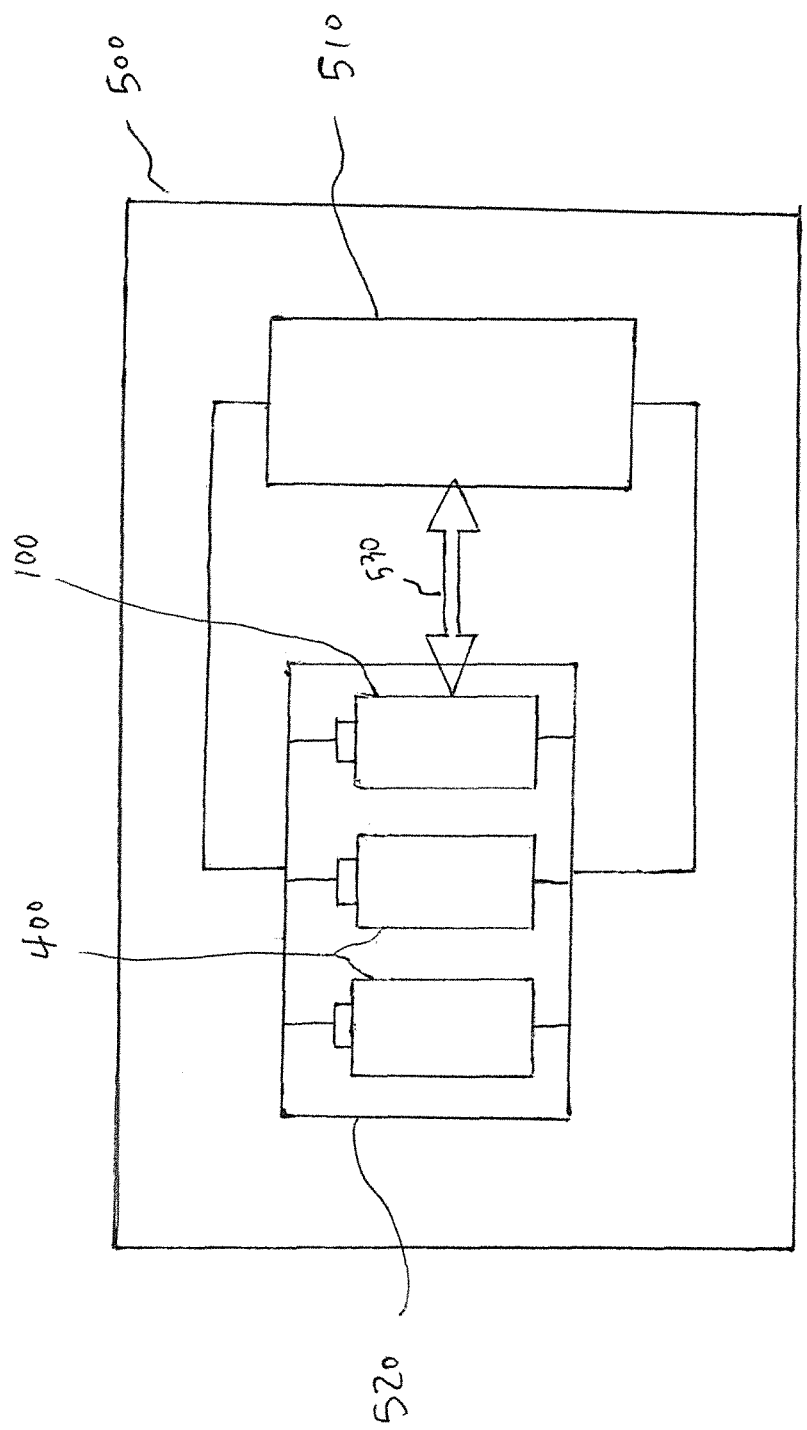
FIG. 4 illustrates an embodiment of a communication electronic module of the present invention being used in an electronic device.

Now referring to FIG. 4, a communication electronics module 100 embodied in FIG. 1 is used in an electronic device 500. As shown in FIG. 4, a three-slot battery socket 520 is provided along with the electronics of unit 100, in a unit 510. The module 100 is inserted into one of the slots in the battery socket 520 along with two other conventional batteries 400 being inserted in the two other slots of the battery socket. Once the module 100 is in electrical contacts with the socket, the two batteries 400 may provide power to the module 100. The module 100 may communicate with the device electronics 510 through a wired connection interface 530 or through the antenna 150 within the module 100, as shown in FIG. 1. Through the antenna 150, the module may also communicate with an electronics device other than the device 500. A switch (not shown) may be included in the module 100 to connect or disconnect the batteries 400 from the powered electronic device 500. In another embodiment, the switch may be controlled through an application interface on a smartphone. In one embodiment, the module 100 may include a circuit for monitoring the battery life of the batteries in the neighboring slots once they are inserted in the socket.

Figure 5:
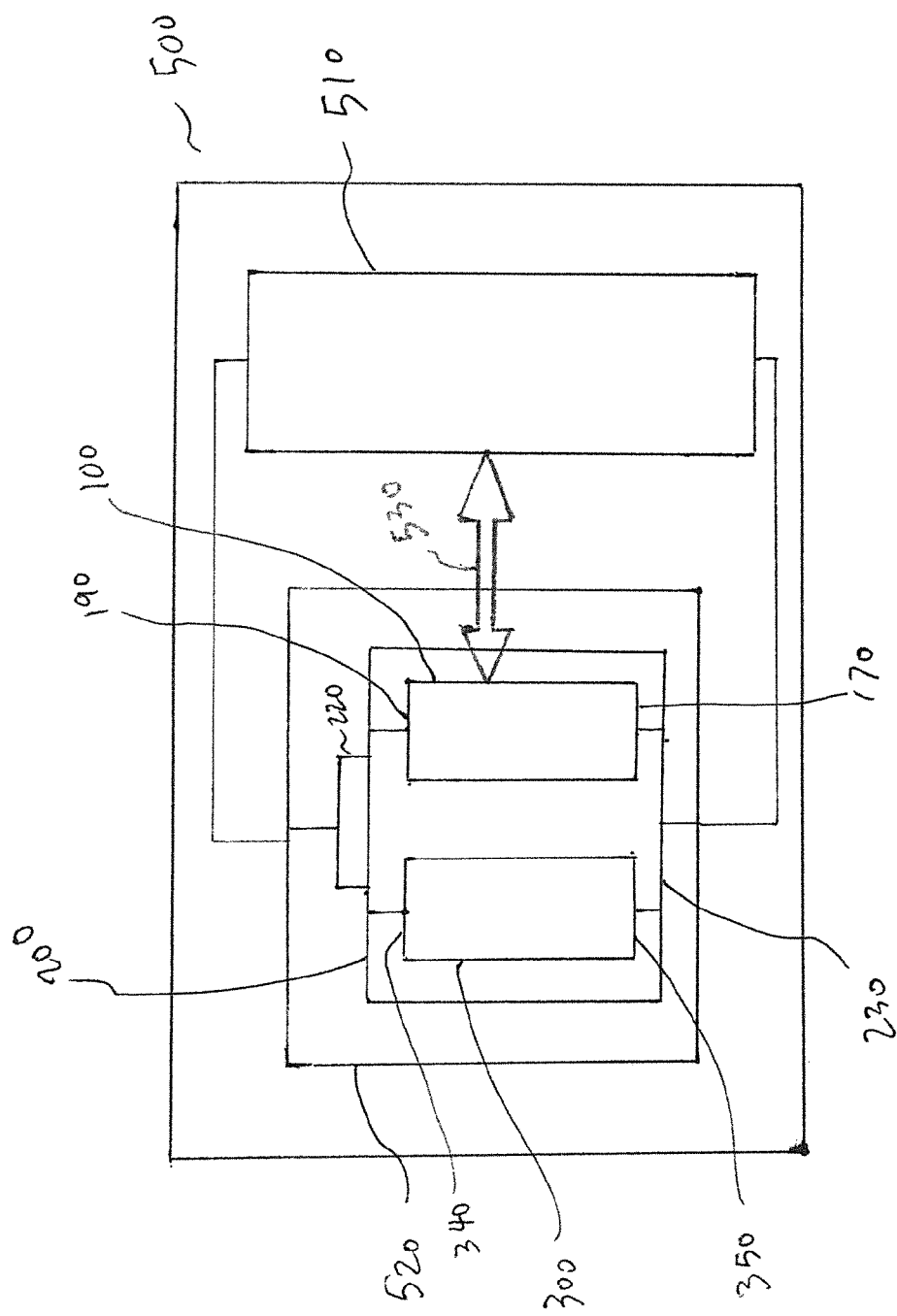
FIG. 5 is a schematic of an electronic device powered by a battery pack of the present invention.

Now referring to FIG. 5, a battery pack 200 which includes a communication electronics module 100 as embodied in FIG. 2 is used in an electronics device 500. As shown in FIG. 5, the electronic device 500 is provided with a socket 520 for a battery pack. The battery pack 200 includes a battery cell 300 and the communication electronics module 100. In a different embodiment, the battery pack may include more than one battery cell. The battery cell 340 provides power for the communication electronics module 100 through the circuit terminals 190 and 170. Once the battery pack 200 is inserted into the socket 520, the battery cell 300 provides power to the electronic device 500 through the battery cell electrodes 340 and 350 and the battery pack terminals 220 and 230 which are connected to the battery cell 340 and 350. The communication electronics module 100 communicates with device electronics 510 through a wired connection interface 530 or through the antenna 150 within the module 100, as shown in FIG. 1. Through the antenna 150, the module may also communicate with an electronics device other than the device 500.

Having thus described my invention, it claims:

1. An electronic device with a communication electronics module comprising:

the electronic device having a battery socket;

the communication electronics module comprising:

a casing having a positive circuit terminal and a negative circuit terminal;

a sensor for sensing an acoustic, vibrational or electrical signal generated by the electronic device, the sensor being disposed in the casing and electrically connected to the terminals of the casing;

a transmitter for transmitting a signal upon sensing the signal from the electronic device, the transmitter being disposed in the casing and electrically connected to the terminals of the casing; and wherein the casing of the communication electronics module is configured to fit in the battery socket of the electronic device such that the communication electronics module is electrically connected to the battery socket through the terminals of the casing and sends an alarm signal to a remote receiver when the sensor senses an acoustic, vibrational or electrical signal generated by the electronic device.

2. The electronic device of claim 1, wherein the transmitter transmits the signal to a remote receiver.

3. The electronic device of claim 1, wherein the transmitter transmits an audio signal of its own.

4. The electronic device of claim 1, wherein the transmission is wired or wireless.

5. The electronic device of claim 1, wherein the sensor is a microphone or a vibration sensor.

6. The electronic device of claim 1, wherein the casing is metallic.

7. The electronic device of claim 1, wherein the signal generated by the electronic device is an audio signal.

8. The electronic device of claim 1, wherein the signal transmitted by the transmitter is an audio signal.

9. The electronic device of claim 1, further comprising a transceiver for transmitting a signal to a remote receiver upon sensing the signal from the electronic device, and for receiving an acknowledgement signal from the remote receiver after the remote receiver receives the signal transmitted by the transceiver, the transceiver being disposed in the casing and electrically connected to the terminals of the casing.

10. The electronic device of claim 1, wherein the module is configured to fit in a single slot of a multiple-slot battery socket and when other slots of the multiple-slot battery socket is filled with batteries, the module is powered by the batteries.

11. The electronic device of claim 1, further comprising:
a battery cell disposed in the casing and electrically connected to the terminals of the casing; and
wherein the communication electronics module is powered by the battery cell.

12. The electronic device of claim 11, wherein the electronic device is electrically connected to the communication electronics module and powered by the battery cell in the communication electronics module.

13. The electronic device of claim 1, wherein the module is operable to turn off the signal from the transceiver upon receiving the acknowledgement signal.

14. The electronic device of claim 12, further comprising a micro-switch for sensing the connection between the module and the electronic device.

15. The electronic device of claim 12, further comprising a switch for connecting or disconnecting the battery cell from the electronic device.

16. The electronic device of claim 1, further comprising a memory.

17. The electronic device of claim 1, wherein the signal from the transceiver is an Internet signal.

18. The electronic device of claim 11, further comprising a monitoring circuit for monitoring battery life of the battery cell.

19. The electronic device of claim 1, further comprising a compensating circuit for a lithium battery.

20. An electronic device with a battery pack comprising:
the electronic device;
the battery pack having a communication electronics module comprising:
a casing having a positive circuit terminal and a negative circuit terminal,
a sensor for sensing an acoustic, vibrational or electrical signal generated by the electronic device, the sensor being disposed in the casing and electrically connected to the terminals of the casing,
a transmitter for transmitting a signal upon sensing the signal from the electronic device, the transmitter being disposed in the casing and electrically connected to the terminals of the casing;
at least one battery cell having a positive electrode and a negative electrode, wherein the module is powered by the at least one battery cell; and
the electronic device having a housing with a positive battery pack terminal and a negative battery pack terminal, both the battery cell and the communication electronics module are received by the housing, the positive battery pack terminal electrically connected to both the positive electrode and the positive circuit terminal, and the negative battery pack terminal electrically connected to both the negative electrode and the negative circuit terminal;
wherein the communication electronics module sends an alarm signal to a remote receiver when the sensor senses an acoustic, vibrational or electrical signal generated by the electronic device.

21. The electronic device of claim 20, wherein the transmitter transmits the signal to a remote receiver.

22. The electronic device of claim 20, wherein the transmitter transmits an audio signal of its own.

23. The electronic device of claim 20, wherein the communication electronics module further comprises a transceiver for transmitting a signal to a remote receiver upon sensing the signal from the electronic device, and for receiving an acknowledgement signal from the remote receiver after the remote receiver receives the signal transmitted by the transceiver, the transceiver being disposed in the casing and electrically connected to the terminals of the casing.

24. The electronic device of claim 20, wherein the casing is the size of the at least one battery cell.

25. The electronic device of claim 20, wherein the electronic device is powered by the at least one battery cell.

26. The electronic device of claim 20, wherein the communication electronics module further includes a switch for connecting or disconnecting the at least one battery cell from the electronic device powered by the at least one battery cell.

27. The electronic device of claim 20, further comprising a monitoring circuit for monitoring battery life of the at least one battery cell.

28. The electronic device of claim 1, wherein the sensor senses excessive electrical current draw by the module itself.

29. The electronic device of claim 20, wherein the sensor senses excessive electrical current draw by the battery pack itself.

* * * * *